United States Patent [19]

Sakamoto

[11] Patent Number: 4,755,831

[45] Date of Patent: Jul. 5, 1988

[54] MULTI-LAYER FULL-COLOR THERMOSENSITIVE SHEET RECORDING METHOD

[75] Inventor: Hiroshi Sakamoto, Numazu, Japan

[73] Assignee: Ricoh Company, Ltd., Tokyo, Japan

[21] Appl. No.: 879,887

[22] Filed: Jun. 30, 1986

[30] Foreign Application Priority Data

Jun. 28, 1985 [JP] Japan ................................ 60-142755

[51] Int. Cl.[4] ...................... G01D 15/10; G01D 15/34; G03C 5/16

[52] U.S. Cl. ................................ 346/1.1; 346/76 PH; 430/348; 430/351; 430/964

[58] Field of Search ................. 346/1.1, 76 R, 76 PH; 430/258, 348–350, 1, 964

[56] References Cited

U.S. PATENT DOCUMENTS 3,813,677 5/1974 Shimotsuma ...................... 346/76 R 4,365,254 12/1982 Ozawa et al. ......................... 346/1.1

4,492,965 1/1985 Oanishi et al. ........................ 346/1.1

4,532,523 7/1985 Tanaka ........................... 346/76 PH 4,563,691 1/1986 Noguchi et al. ............... 346/76 PH

*Primary Examiner*—E. A. Goldberg

*Assistant Examiner*—Gerald E. Preston

*Attorney, Agent, or Firm*—Oblon, Fisher, Spivak, McClelland & Maier

[57] ABSTRACT

A multi- and full-color thermosensitive recording method of recording multi- or full-color images on a multi-color thermosensitive recording sheet capable of forming 2 to 4 different colors by use of a thermal head is disclosed, with the improvement that the picture elements of a thermal head are grouped so as to be operative in the form of a matrix consisting of n picture elements in the main scanning direction and m picture elements in the sub-scanning direction, each matrix is assigned to 2 to 4 alternatively independent colorings and thermal recording is performed in such a manner that, of the n×m picture elements in each matrix, the number of the picture elements for each color formation is changed, whereby multi- and full-color recording with a multi-step pseudo density gradation is attained.

7 Claims, 3 Drawing Sheets

MULTI-LAYER FULL-COLOR THERMOSENSITIVE SHEET RECORDING METHOD

BACKGROUND OF THE INVENTION

The present invention relates to a multi- and full-color thermosensitive recording method, and more particularly to a multi- and full-color thermosensitive recording method of forming colored images on a thermosensitive recording sheet capable of forming two to four different colors thereon by application of different quantities of thermal energy thereto.

Recently a thermosensitive recording method of recording images on a thermosensitive recording material in a mono-color by utilizing chemical or physical changes of thermosensitive materials upon application of thermal energy is widely used, not only for copying books and documents, but also in the printers for recording output information from measuring instruments and computers, facsimile, automatic ticket vendors, and in label printers of POS systems. This wide application of the thermosensitive recording method is due to the advantages over other conventional recording methods that no noise is generated during recording and image development and fixing steps are unnecessary.

Further, there is a great demand for multi- or full-color recording of the output information in accordance with the recent popularization of personal computers and development of information transmission systems. As a matter of course, research and development activities for developing recording materials and methods capable of attaining multi- or full-color recording are conducted.

As recording methods capable of attaining such multi- and full-color recording, for example, ink-jet recording method, thermosensitive recording method, electrostatic recording method, electrophotographic recording method and silver halide photographic recording method are known. Of these methods, research and development of the thermosensitive recording method are most actively performed because of the advantage over other methods that the mechanical maintenance is extremely easy in addition to the previously mentioned advantages of the thermosensitive recording method As thermosensitive recording methods capable of performing multi- or full-color recording, a wax thermal image transfer method, a reaction-type thermal image transfer method and a sublimation-type thermal image transfer method are known. These thermal image transfer methods, however, have the shortcomings that two sheets, that is, an image transfer sheet and an image acceptor sheet, are necessary and a different image transfer sheet is also necessary for each color formation for multi- or full-color recording, so that the recording process is extremely complicated.

SUMMARY OF THE INVENTION

It is therefore an object of the present invention to provide a multi- and full-color thermosensitive recording method by use of a direct coloring type thermosensitive recording sheet.

According to the present invention, a thermosensitive recording sheet capable of forming two to four different colors is employed and multi- or full-color images for recording are formed by use of a thermal head in such a manner that each color is provided with a density gradation as desired.

DETAILED DESCRIPTION OF THE PREFERRED EMBODIMENTS

According to the present invention, in a multi- and full-color thermosensitive recording method of recording multi- or full-color images on a multi-color thermosensitive recording sheet capable of forming 2 to 4 different colors by use of a thermal head, an improvement is provided, in which the picture elements of the thermal head are grouped so as to form a matrix consisting of n picture elements in the main scanning direction and m picture elements in the sub-scanning direction, each matrix is assigned to one of 2 to 4 alternatively independent colorings. In performing thermal recording, of the $n \times m$ picture elements in each matrix, the number of the picture elements for color formation can be changed, so that multi- and full-color recording with a multi-step pseudo density gradation is attained.

A multi-color thermosensitive recording sheet capable of forming 2 to 4 different colors by application of different quantities of thermal printing energy for use in the present invention is conventionally known, for instance, in Japanese Laid-Open Patent Application No. 56-40588.

Such a multi-color thermosensitive recording sheet comprises a support material, a plurality of thermosensitive coloring layers formed thereon, which are colored in different colors upon application of different quantities of thermal energy thereto. Between these thermosensitive coloring layers, decolorizing layers containing a decolorizing agent, for instance, an organic basic material, are interposed. Developable color combinations are, for example, black—red, black—blue, blue—red—black, cyan—magenta—yellow, and black—cyan—magenta—yellow.

In such a multi-color thermosensitive recording sheet, it is possible to produce a color with a density gradation corresponding to the desired color tone at the top coloring layer by use of a single heating resistor. However, with respect to the coloring of the thermosensitive coloring layers below the top layer, it is extremely difficult to produce colors with the density gradations corresponding to the desired color tone by use of a single heating resistor. In order to carry out full-color image recording, it is necessary to reproduce the three primary colors, cyan, magenta and yellow, in such a manner that each color has a density gradation corresponding to the desired color tone.

The present invention provides a novel method of reproducing the three primary colors in such a manner that each color can be provided with a density gradation as desired.

With reference to the accompanying drawings, the present invention will now be specifically explained.

Figure 1:
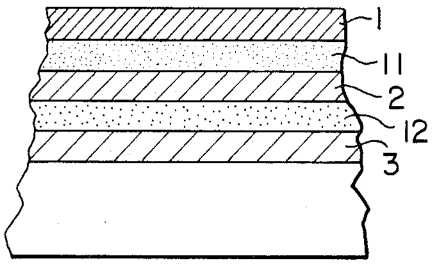
FIG. 1 shows a schematic cross-sectional view of an example of a multi-color thermosensitive recording sheet for use in the present invention.

FIG. 1 schematically shows the basic structure of an example of a multi-color thermosensitive recording sheet for use in the present invention.

In the figure, reference numerals 1, 2 and 3 respectively indicate a low-temperature thermosensitive coloring layer, a medium-temperature thermosensitive coloring layer and a high-temperature thermosensitive coloring layer, which are respectively colored by application of a low thermal printing energy, a medium thermal printing energy and a high thermal printing energy. Reference numerals 11 and 12 respectively indicate a first decolorizing layer and a second decolorizing layer, which respectively act upon the low-temperature thermosensitive coloring layer and the medium-temperature thermosensitive coloring layer so as to decolorize the color developed in the low-temperature thermosensitive coloring layer at the formation of colored images in the medium-temperature thermosensitive coloring layer and to decolorize the color developed in the medium-temperature thermosensitive coloring layer at the formation of colored images in the high-temperature thermosensitive coloring layer. By the above explained structure, for instance, cyan, magenta and yellow can be formed.

In order to reproduce each color more clearly in each thermosensitive coloring layer, a barrier layer can be interposed between the thermosensitive coloring layer 1 and the first decolorizing layer 11, between the first decolorizing layer 11 and the thermosensitive coloring layer 2, between the thermosensitive coloring layer 2 and the second decolorizing layer 12, and between the second decolorizing layer 12 and the thermosensitive coloring layer 3.

When producing three colors, cyan, magenta and yellow, in such a multi-color thermosensitive recording sheet, a first color (for instance, cyan) is produced by application of a small quantity of thermal energy (for instance, 0.5 to 1.0 mJ/dot) through a thermal head including 100 $\mu m \times 270$ $\mu m$ heating resistor elements, each of which elements constitutes one picture element, a second color (for instance, magenta) by application of a medium quantity of thermal energy (for instance, 1.0 to 2.0 mJ/dot) and a third color (for instance, yellow) by application of a large quantity of thermal energy (for instance, 2.5 to 4.0 mJ/dot).

Figure 2A:
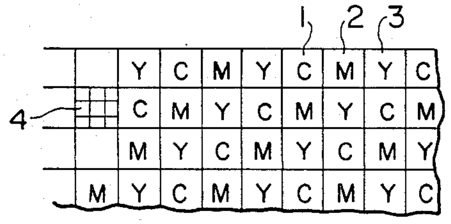
FIGS. 2(*a*) and 2(*b*) show examples of a method of grouping the picture elements of a thermal head.
Figure 2B:
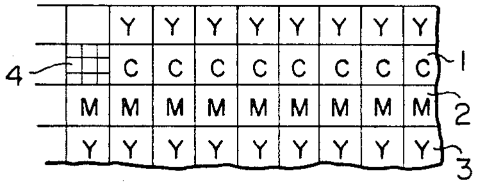

With reference to FIGS. 2(*a*) and 2(*b*), a group of the picture elements of a thermal head are grouped so as to form a matrix consisting of 9 ($=3\times3$) picture elements, 3 picture elements in the main scanning direction and 3 picture elements in the sub-scanning direction. Each matrix is alternatively assigned to cyan(C), magenta(M) and Yellow (Y) in the main scanning direction in FIG. 2(*a*) and in the sub-scanning direction in FIG. 2(*b*). In the figures, reference numeral 4 indicates one picture element of the thermal head, having the same size as that of the above-mentioned heating resistor element.

In FIGS. 2(*a*) and 2(*b*), reference numerals 1, 2 and 3 indicate matrixes respectively assigned to cyan, magenta and yellow. In this example, by changing the number of the picture elements to be colored out of 9 ($=3\times3$) picture elements in each color, 9 pseudo density gradations can be obtained on the thermosensitive recording sheet. By use of the three matrixes, C, M and Y as picture element units for recording colored images, full-color image recording can be attained in the present invention.

In the present invention, black printer correction can be performed, for instance, (i) by use of a thermosensitive recording sheet capable of reproducing four colors, for example, black, cyan, magenta and yellow, with addition of a black (B) matrix to the C, M and Y matrixes shown in FIGS. 2(*a*) and 2(*b*), and (ii) by assigning some of the non-coloring picture elements of the nine picture elements in each matrix (C, M or Y) to black coloring.

Figure 3A:
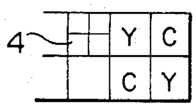
FIGS. 3(*a*), 3(*b*) and 3(*c*) show examples of another method of segmenting and grouping the picture elements of a thermal head.
Figure 3B:
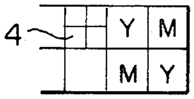
Figure 3C:
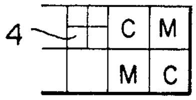

FIGS. 3(*a*), 3(*b*) and 3(*c*) show examples of a segmentation of each matrix into 4 ($=2\times2$) picture elements of a thermal head. In FIG. 3(*a*), by use of Y and C matrixes, green coloring is attained. Likewise, red coloring is attained by use of Y and M matrixes in FIG. 3(*b*) and blue coloring is attained by use of C and M matrixes in FIG. 3(*c*). When the picture elements in each matrix shown in FIGS. 3(*a*), 3(*b*) and 3(*c*) are used for each single coloring, image recording of 6 distinguishable colors can be carried out. Further, when the number of the colored picture elements out of the 4 picture elements in each matrix is changed, image recording of more than 6 distinguishable colors can also be carried out.

As explained above, it is possible to provide the images recorded on the multi-color thermosensitive recording sheet by use of each of the above matrixes of the thermal head with the multi-distinguishable colors and the density gradations corresponding to the number ($n\times m$) of the picture elements in each matrix.

Therefore, according to the present invention, multi- and full-color recording can be attained on the thermosensitive recording sheet.

For use in practice, it is necessary to determine the number (n) of the picture elements in the main scanning direction and the number (m) of the picture elements in the sub-scanning direction, which constitute each matrix, in accordance with (i) the number of the picture elements of an original image to be recorded (for instance the number of the picture elements of the image televised for home use is 525 lines$\times$525 lines) and (ii) the density of the heating resistor elements of the thermal head. For obtaining appropriate density gradation and resolution for use in practice, it is preferable to use a thermal head including heating resistor elements with a density of 12 lines/mm or 16 lines/mm. The thermal energy to be applied to such heating resistor elements can be determined in accordance with the coloring sensitivity of each color of the multi-color thermosensitive recording sheet capable of reproducing 2 to 4 colors, with appropriate adjustment of the power (or voltage) or of the pulse width thereof to be applied to the heating resistor elements.

As the dyes employed in the thermosensitive coloring layers of the thermosensitive recording sheet for use in the present invention, the leuco dyes conventionally employed in the field of thermosensitive recording materials can be employed. They can be used alone or in combination. Examples of such leuco dyes are triphenylmethane-type leuco compounds, fluoran-type leuco compounds, phenothiazine-type leuco compounds, auramine-type leuco compounds and spiropyran-type leuco compounds. Specific examples of those leuco dyes are as follows:

3,3-bis(p-dimethylaminophenyl)-phthalide, 3,3-bis(p-dimethylaminophenyl)-6-dimethylaminophthalide (or Crystal Violet Lactone),
3,3-bis(p-dimethylaminophenyl)-6-diethylaminophthalide,
3,3-bis(p-dimethylaminophenyl)-6-chlorophthalide,
3,3-bis(p-dibutylaminophenyl)-phthalide,
3-diethylamino-6-chloro-7-methylfluoran,
3-cyclohexylamino-6-chlorofluoran,
3-dimethylamino-5,7-dimethylfluoran,
3-diethylamino-7-chlorofluoran,
3-diethylamino-7-methylfluoran,
3-diethylamino-7,8-benzfluoran,
3-diethylamino-6-methyl-7-chlorofluoran,
3-(N-p-tolyl-N-ethylamino)-6-methyl-7-anilinofluoran,
3-pyrrolidino-6-methyl-7-anilinofluoran,
2-[N-(3'-trifluoromethylphenyl)amino]-6-diethylaminofluoran,
2-[3,6-bis(diethylamino)-9-(o-chloroanilino)xanthylbenzoic acid lactam],
3-diethylamino-6-methyl-7-(m-trichloromethylanilino)-fluoran,
3-diethylamino-7-(o-chloroanilino)fluoran,
3-dibutylamino-7-(o-chloroanilino)fluoran,
3-dibutylamino-7-(o-fluoroanilino)fluoran,
3-N-methyl-N-amylamino-6-methyl-7-anilinofluoran,
3-N-methyl-N-cyclohexylamino-6-methyl-7-anilinofluoran,
3-diethylamino-6-methyl-7-anilinofluoran,
3-(N-isoacyl-N-ethyl)amino-7-(o-chloroanilino)fluoran,
3-(N-hexyl-N-methyl)amino-7-(o-chloroanilino)fluoran,
3-(N,N-diethylamino)-5-methyl-7-(N,N-dibenzylamino) fluoran, benzoyl leuco methylene blue,
6'-chloro-8'-methoxy-benzoindolino-spiropyran,
6'-bromo-3'-methoxy-benzoindolino-spiropyran,
3-(2'-hydroxy-4'-dimethylaminophenyl)-3-(2'-methoxy-5'-chlorophenyl)phthalide,
3-(2'-hydroxy-4'-dimethylaminophenyl)-3-(2'-methoxy-5'nitrophenyl)phthalide,
3-(2'-hydroxy-4'-diethylaminophenyl)-3-(2'-methoxy-5'methylphenyl)phthalide,
3-(2'-methoxy-4'-dimethylaminophenyl)-3-(2'-hydroxy-4'chloro-5'-methylphenyl)phthalide,
3-morpholino-7-(N-propyl-trifluoromethylanilino)fluoran,
3-pyrrolidino-7-trifluoromethylanilinofluoran,
3-diethylamino-5-chloro-7-(N-benzyl-trifluoromethylanilino)fluoran,
3-pyrrolidino-7-(di-p-chlorophenyl)methylaminofluoran,
3-diethylamino-5-chloro-7-(α-phenylethylamino)fluoran,
3-(N-ethyl-p-toluidino)-7-(α-phenylethylamino)fluoran,
3-diethylamino-7-(o-methoxycarbonylphenylamino)-fluoran,
3-diethylamino-5-methyl-7-(α-phenylethylamino)fluoran,
3-diethylamino-7-piperidinofluoran,
2-chloro-3-(N-methyltoluidino)-7-(p-n-butylanilino)-fluoran,
3-(N-benzyl-N-cyclohexylamino)-5,6-benzo-7-α-naphthylamino-4'-bromofluoran,
3-diethylamino-6-methyl-7-mesidino-4',5'-benzofluoran,
3-diethylamino-7-chlorofluoran,
3-diethylamino-6-methyl-7-chlorofluoran,
3-cyclohexylamino-6-chlorofluoran and
3-diethylaminobenzo[α]fluoran.

As the color developers capable of inducing color formation in the above leuco dyes upon application of heat, for use in the low-temperature, medium-temperature and high-temperature thermosensitive coloring layers, for example, the following can be employed:
N,N'-diphenylthiourea,
N-p-ethylphenyl-N'-phenylthiourea,
N-p-butylphenyl-N'-phenylthiourea,
N,N'-di-m-chlorophenylthiourea,
N,N'-di-p-chlorophenylthiourea,
N,N'-di-m-trifluoromethylphenylthiourea,
N,N'-di-m-methylphenylthiourea,
4,4'-isopropylidenediphenol,
4,4'-isopropylidenebis(2-chlorophenol),
4,4'-isopropylidenebis(2,6-dibromophenol),
4,4'-isopropylidenebis(2,6-dichlorophenol),
4,4'-isopropylidenebis(2-methylphenol),
4,4'-isopropylidenebis(2-tert-butylphenol),
4,4'-sec-butylidenediphenol,
4,4'-cyclohexylidenebis(2-methylphenol),
4-tert-butylphenol,
4-phenylphenol,
4-hydroxydiphenoxide,
α-naphthol,
β-naphthol,
3,5-xylenol,
thymol,
methyl-4-hydroxybenzoate,
4-hydroxyacetophenone,
novolak-type phenolic resin,
2,2'-thiobis(4,6-dichlorophenol),
catechol,
resorcinol,
hydroquinone,
pyrogallol,
phloroglucine,
phloroglucinocarboxylic acid,
4-tert-octylcatechol,
2,2'-methylenebis(4-chlorophenol),
2,2'-methylenebis(4-methyl-6-tert-butylphenol),
2,2'-dihydroxy-diphenyl,
ethyl p-hydroxybenzoate,
propyl p-hydroxybenzoate,
butyl p-hydroxybenzoate,
benzyl p-hydroxybenzoate,
p-chlorobenzyl p-hydroxybenzoate,
o-chlorobenzyl p-hydroxybenzoate,
p-methylbenzyl p-hydroxybenzoate,
n-octyl benzoic acid p-hydroxybenzoate,
zinc salicylate,
1-hydroxy-2-naphthoic acid,
2-hydroxy-6-naphthoic acid,
zinc 2-hydroxy-6-naphthoate,
4-hydroxy diphenyl sulfone,
4-hydroxy-4'-chlorodiphenyl sulfone,
bis(4-hydroxyphenyl)sulfide,
o-sulfophthalimide,
5-isopropyl-o-sulfophthalimide,
5-t-butyl-o-sulfophthalimide,
5-octyl-o-sulfophthalimide and
4,4'-thiobis(3-methyl-6-t-butylphenol).

In the thermosensitive coloring sheet for use in the present invention, a variety of binder agents can be employed for fixing the above-mentioned thermosensitive coloring layers and decolorizing layers to the support material and to the other layers in contact therewith.

Specific examples of such binder agents are as follows: polyvinyl alcohol; starch and starch derivatives; cellulose derivatives such as methoxycellulose, hydroxyethylcellulose, carboxymethylcellulose, methylcellulose and ethylcellulose; water-soluble polymeric materials such as sodium polyacrylate, polyvinylpyrrolidone, acrylamide/acrylic acid ester copolymer, acrylamide/acrylic acid ester/methacrylic acid copolymer, styrene/maleic anhydride copolymer alkali salt, isobutylene/maleic anhydride copolymer alkali salt, polyacrylamide, sodium alginate, gelatin and casein; and polyvinyl acetate, polyurethane, styrene/butadiene copolymer, polyacrylic acid, polyacrylic acid ester, vinyl chloride/vinyl acetate copolymer, polybutylmethacrylate, ethylene/vinyl acetate copolymer and styrene/butadiene/acrylic acid derivative copolymer.

Further in the thermosensitive coloring sheet for use in the present invention, auxiliary additive components which are employed in the conventional thermosensitive recording materials, such as fillers and thermofusible materials, can be employed in the thermosensitive coloring layers and decolorizing layers.

As the fillers, for example, the following can be employed: inorganic powders of calcium carbonate, silica, zinc oxide, titanium oxide, aluminum hydroxide, zinc hydroxide, barium sulfate, clay, talc and surface-treated calcium and silica; and organic powders of urea—formaldehyde resin, styrene/methacrylic acid copolymer and polystyrene resin.

As the thermo-fusible materials, for example, higher fatty acids, esters, amides and metallic salts thereof, waxes, condensation products of aromatic carboxylic acids and amines, benzoic acid phenyl esters, higher straight chain glycols, 3,4-epoxy-dialkyl hexahydrophthalate, higher ketones and other thermofusible organic compounds having melting points ranging from about 50° C. to 200° C. can be employed.

With reference to the following examples, the present invention will now be explained in detail.

EXAMPLE 1

[Preparation of High-temperature Thermosensitive Coloring Layer Formation Liquid]

A dispersion A-1 and a dispersion B-1 were separately prepared by grinding and dispersing the following respective components in a sand grinder:

| | Parts by Weight |
|---|---|
| Dispersion A-1 | |
| 3-cyclohexylamino-6-chlorofluoran (yellow orange dye) | 20 |
| 10% aqueous solution of polyvinyl alcohol | 20 |
| Water | 60 |
| Dispersion B-1 | |
| 4,4'-dihydroxydiphenylsulfone | 15 |
| calcium carbonate | 15 |
| 10% aqueous solution of polyvinyl alcohol | 30 |
| Water | 40 |

The above prepared Dispersion A-1 and Dispersion B-1 were mixed well with a ratio by weight of 1:8, so that a high-temperature thermosensitive coloring layer formation liquid was prepared.

[Preparation of Decolorizing Layer Formation Liquid]

The following components were dispersed in a sand grinder, so that Dispersion C was prepared, which served as a decolorizing layer formation liquid:

| Dispersion C | Parts by Weight |
|---|---|
| N,N'—isophthaloyldi(N—cyclohexyl-N—methylamide) | 20 |
| calcium carbonate | 5 |
| 10% aqueous solution of polyvinyl alcohol | 25 |
| Water | 50 |

[Preparation of Intermediate-Temperature Thermosensitive Coloring Layer Formation Liquid]

A dispersion A-2 and a dispersion B-2 were separately prepared by grinding and dispersing the following respective components in a sand grinder:

| | Parts by Weight |
|---|---|
| Dispersion A-2 | |
| 3-diethylaminobenzo[C]fluoran (magenta dye) | 20 |
| 10% aqueous solution of polyvinyl alcohol | 20 |
| Water | 60 |
| Dispersion B-2 | |
| 4,4'-thiobis(2-t-butyl-5-methylphenol) | 15 |
| ethylenebisstearamide | 8 |
| Calcium carbonate | 10 |
| 10% aqueous solution of polyvinyl alcohol | 30 |
| Water | 37 |

The above prepared Dispersion A-2 and Dispersion B-2 were mixed well with a ratio by weight of 1:3, so that a medium-temperature thermosensitive coloring layer formation liquid was prepared.

[Preparation of Low-Temperature Thermosensitive Coloring Layer Formation Liquid]

A dispersion A-3 and the dispersion B-3 were separately prepared by grinding and dispersing the following respective components in a sand grinder:

| | Parts by Weight |
|---|---|
| Dispersion A-3 | |
| Crystal Violet Lactone (blue dye) | 20 |
| 10% aqueous solution of polyvinyl alcohol | 20 |
| Water | 60 |
| Dispersion B-3 | |
| 3,3'-dichlorodiphenylthiourea | 10 |
| p-benzylbiphenyl | 8 |
| zinc stearate | 3 |
| calcium carbonate | 15 |
| 10% aqueous solution of polyvinyl alcohol | 30 |
| Water | 34 |

The above prepared Dispersion A-3 and Dispersion B-3 were mixed well with a ratio by weight of 1:4, so that a low-temperature thermosensitive coloring layer formation liquid was prepared.

The high-temperature thermosensitive coloring layer formation liquid was first coated on a sheet of commercially available high quality paper (basis weight: 45

$g/m^2$) with a deposition of 7 $g/m^2$ on a dry basis, so that a high-temperature thermosensitive coloring layer was formed on the high quality paper.

The decolorizing layer formation liquid (Dispersion C) was then coated on the high-temperature coloring layer with a deposition of 4 $g/m^2$ on a dry basis, so that a second decolorizing layer was formed on the high-temperature coloring layer.

The intermediate-temperature thermosensitive coloring layer formation liquid was then coated on the second decolorizing layer with a deposition of 4 $g/m^2$ on a dry basis, so that an intermediate-temperature thermosensitive coloring layer was formed on the second decolorizing layer.

The decolorizing layer formation liquid was then coated on the intermediate-temperature thermosensitive coloring layer with 'a deposition of 4 $g/m^2$ on a dry basis, so that a first decolorizing layer was formed on the intermediate-temperature thermosensitive coloring layer.

Finally, the low-temperature thermosensitive coloring layer formation liquid was coated on the first decolorizing layer with a deposition of 4.5 $g/m^2$ on a dry basis, so that a low-temperature thermosensitive coloring layer was formed on the first decolorizing layer, whereby a three-color thermosensitive coloring sheet was prepared.

This three-color thermosensitive coloring sheet was subjected to calendering so as to make the surface of the thermosensitive recording sheet smooth, whereby a three-color thermosensitive recording sheet for use in the present invention was prepared.

The thus prepared three-color thermosensitive coloring sheet was subjected to thermal printing tests by use of a thermal recording apparatus including a thin-film line-type thermal head operable at a main scanning dot density of 8 dots/mm and a sub-scanning dot density of 7.7 dots/mm, with the pulse width for application of thermal energy to the thermosensitive recording sheet changed under a fixed power of 0.46 Watt/dot.

When a thermal printing energy of 0.51 mJ/dot was applied with a pulse width of 1.1 ms, a clear blue color was formed on the thermosensitive recording sheet. Likewise when a thermal printing energy of 1.1 mJ/dot was applied with a pulse width of 2.4 ms, a clear magenta color was formed, and when a thermal printing energy of 2.48 mJ/dot was applied with a pulse width of 5.4 ms, a yellow orange color was formed on the thermosensitive coloring sheet.

EXAMPLE 2

Figure 4A:
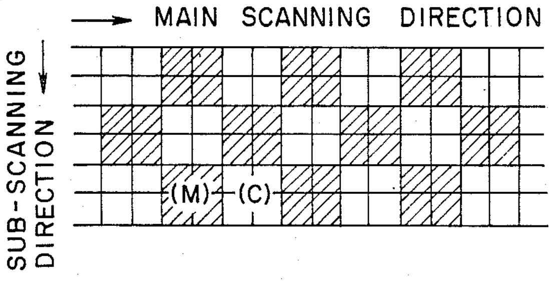
FIGS. 4(*a*), 4(*b*) and 4(*c*) respectively show a purple coloring mode pattern, a green coloring mode pattern, and a red coloring mode pattern for use in the present invention.
Figure 4B:
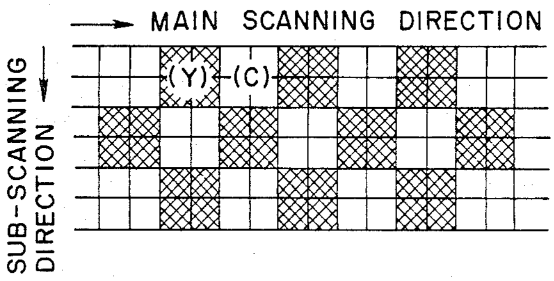
Figure 4C:
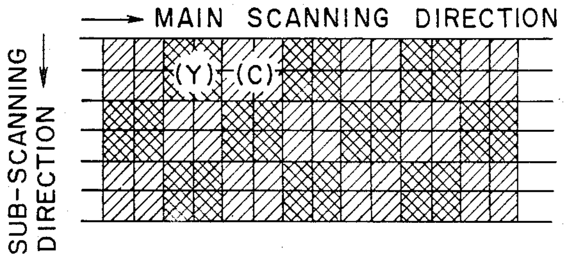

By use of the same thermal head as that employed in Example 1, which was operative at 8 dots/mm in the main scanning direction and at 7.7 dots/mm in the sub-scanning direction, thermal recording was performed with a matrix consisting of 2×2 picture elements alternatively assigned to a low-temperature coloring area (C), a medium-temperature coloring area (M) and a high-temperature coloring area (Y) as shown in FIG. 4(*a*), FIG. 4(*b*) and FIG. 4(*c*).

More specifically, in the case of FIG. 4, a low-temperature coloring area (C) and a medium-temperature coloring area (M) were alternatively formed with application of a thermal printing energy of 0.51 mJ/dot having a pulse width of 1.1 ms and with application of a thermal printing energy of 1.1 mJ/dot having a pulse width of 2.4 ms, respectively. As a result, a purple color was formed as a whole on the thermosensitive coloring sheet.

In the case of FIG. 4(*b*), a low-temperature coloring area (C) and a high-temperature coloring area (Y) were alternatively formed with application of a thermal printing energy of 0.51 mJ/dot having a pulse width of 1.1 ms and with application of a thermal printing energy of 2.48 mJ/dot having a pulse width of 5.4 ms, respectively. As a result, a green color was formed as a whole on the thermosensitive coloring sheet.

In the case of FIG. 4(*c*), a medium-temperature coloring area (M) and a high-temperature coloring area (Y) were alternatively formed with application of a thermal printing energy of 1.10 mJ/dot having a pulse width of 2.4 ms and with application of a thermal printing energy of 2.48 mJ/dot having a pulse width of 5.4 ms. As a result, a red color was formed as a whole on the thermosensitive coloring sheet.

EXAMPLE 3

Figure 5:
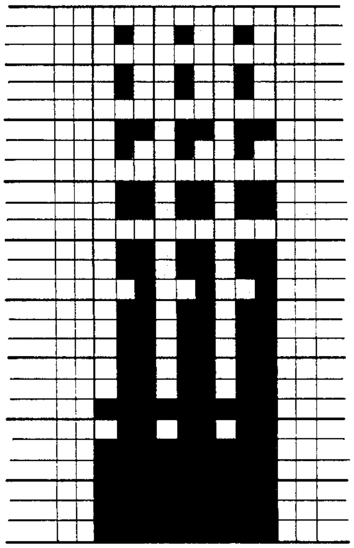
FIG. 5 schematically shows a nine-gradation coloring pattern for use in the present invention.

By use of the same thermal head as that employed in Example 1, which was operative at 8 dots/mm in the main scanning direction and at 7.7 dots/mm in the sub-scanning direction, thermal recording was performed with a matrix consisting of 3×3 picture elements colored as shown in FIG. 5.

More specifically, out of 9 picture elements in each matrix, 1 to 9 picture elements were colored step by step increasingly in the sub-scanning direction as shown in FIG. 5 with application of a thermal printing energy of 1.10 mJ/dot having a pulse width of 2.4 ms. As a result, magenta colors with 9 density gradations were obtained.

This result indicated that when a matrix of 3×3 picture elements was assigned to any of the previously mentioned low-temperature coloring area, medium-temperature coloring area and high-temperature coloring area in the above-described coloring mode, 9 gradations can be obtained in each color.

What is claimed is:

1. In a multi- and full-color thermosensitive recording method of recording multi- or full-color images on a multi-color thermosensitive recording sheet capable of forming 2 to 4 different colors by use of a thermal head, the improvement comprising:

said thermal head having picture elements which are grouped so as to be operative in the form of a matrix consisting of n picture elements in the main scanning direction and m picture elements in the sub-scanning direction, wherein m and n each are an integer, each matrix is assigned to 2 to 4 alternatively independent colorings and thermal recording is performed in such a manner that, of the n×m picture elements in each matrix, the number of the picture elements for each color developed is changed in accordance with the density gradation of each color to be reproduced.

2. The multi- and full-color thermosensitive recording method of claim 1, wherein said different colors formed by said multi-color thermosensitive recording sheet are selected from the group consisting of cyan, magenta, yellow and black.

3. The multi- and full-color thermosensitive recording method of claim 1, wherein said thermosensitive recording sheet comprises a low-temperature thermosensitive coloring layer, a medium-temperature termosensitive coloring layer and a high-termperature thermosensitive coloring layer.

4. The multi- and full-color thermosensitive recording method of claim 1, wherein, as said thermal head comes into contact with said thermosensitive recording sheet, a first color is produced by application of a small quantity of thermal energy ranging from 0.5 to 1.0 mJ/dot, a second color is produced by the application of a medium quantity of thermal energy ranging from 1.0 to 2.0 mJ/dot and a third color is produced by the application of a large quantity of heat ranging from 2.5 to 4.0 mJ/dot.

5. The multi- and full-color thermosensitive recording method of claim 1, wherein said thermal head is provided with heating resistor elements in a density of 23 lines/mm or 16 lines/mm.

6. The multi- and full-color thermosensitive recording method of claim 1, wherein the dyes within the layers of said recording sheet are leuco dyes.

7. The multi- and full-color thermosensitive recording method of claim 6, wherein the leuco dye of any given dye layer is a member selected from the group consisting of triphenylmethane-type leuco compounds, fluoran-type leuco compounds, phenothiazine, type leuco compounds, auramine-type leuco compounds and spiropyran-type leuco compounds.

* * * * *